Aug. 9, 1932.                H. T. BATTIN                1,871,296
                            ENDLESS MANDREL
                         Filed Nov. 22, 1929
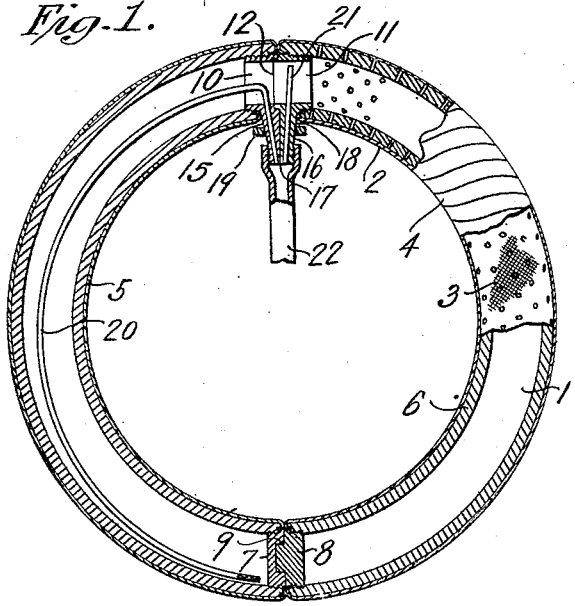
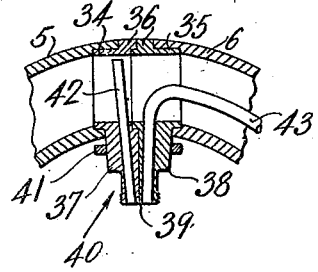
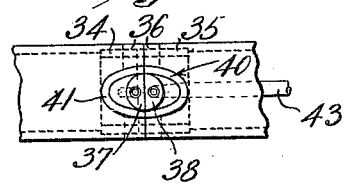
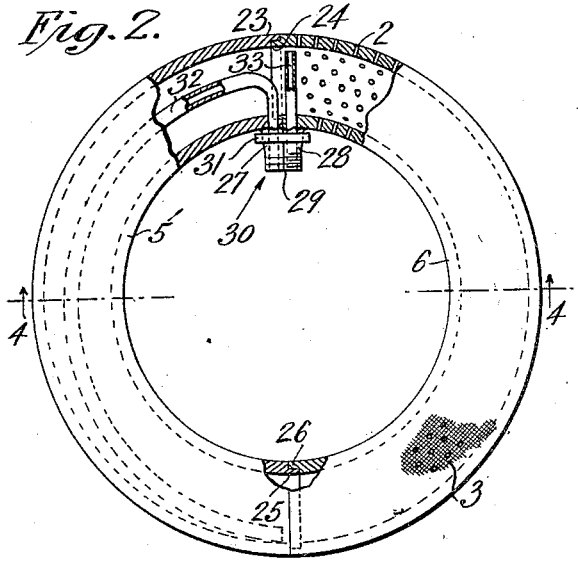
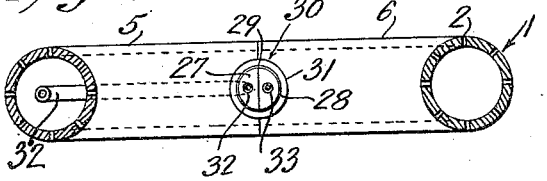
INVENTOR
Harold T. Battin
BY
ATTORNEY Patented Aug. 9, 1932

1,871,296

UNITED STATES PATENT OFFICE

HAROLD T. BATTIN, OF RIDGEWOOD, NEW JERSEY, ASSIGNOR TO MORGAN & WRIGHT, OF DETROIT, MICHIGAN, A CORPORATION OF MICHIGAN

ENDLESS MANDREL

Application filed November 22, 1929. Serial No. 408,945.

This invention relates to a device useful in the manufacture of rubber tubes such as inner tubes from rubber dispersions such as latex. More particularly this invention relates to a mandrel upon which a rubber tube can be formed by the deposition of the solid constituents of the rubber dispersion thereover, which mandrel is continuous and so constructed as to permit removal thereof from the interior of the tube after it has been formed.

In the manufacture of rubber inner tubes, it is usual to construct the tube with two free ends and to subsequently unite the ends of the rubber tube to form a continuous tube. The joint in such a tube is not desirable and the operation incident to making such a joint is costly.

It is an object of this invention to provide a mandrel upon which rubber may be deposited from a dispersion thereof in the form of a continuous tube. It is also an object of this invention to provide a mandrel for making such a tube which mandrel may be removed from the interior of the tube through a small aperture in the tube. Another object of this invention is to provide a mandrel composed of sections which may be released while the mandrel is covered by a rubber tube. A further object of this invention is to provide a mandrel upon which a continuous rubber tube may be formed by deposition from a dispersion thereof, which mandrel is adapted to form an aperture in the tube during its formation through which aperture the mandrel may be withdrawn.

Other objects and advantages of the present invention will appear from the following detailed description taken in connection with the accompanying drawing in which:

Fig. 1 is a cross section of a preferred embodiment of my invention;

Fig. 2 is a modified form of mandrel according to my invention;

Fig. 3 is a cross sectional view taken on line 4—4 of Fig. 2;

Fig. 4 is a detail view showing a modified form of joint; and

Fig. 5 is a plan view of the joint shown in Fig. 4.

The mandrel of this invention is to be used for making rubber tubes by the deposition of the solid constituents of a rubber dispersion on the exterior surface of the mandrel. In order to effect such a deposition of rubber upon the surface of the mandrel, the mandrel is constructed so as to extract the serum from the dispersion surrounding the mandrel thereby effecting the deposition of the solid constituents on the surface of the mandrel. Preferably the mandrel is given such characteristics by making the mandrel hollow as indicated at 1 in Fig. 1 providing apertures through the walls of the mandrel as shown at 2 providing the exterior surface of the mandrel with a knurled surface which facilitates the flow of the serum to the apertures and finally providing a smooth layer of material over the mandrel such as a spiral wrap of fabric 4 which may be coated with a clay slip. Other types of mandrel construction may be employed, however, for instance, a mandrel may be made of absorbent material in which case the serum will be extracted from the surrounding dispersion by an absorbing action of the material itself. In lieu of a serum extracting mandrel construction there may be employed a solid mandrel coated with material to effect the coagulation of the rubber dispersion on the surface thereof. The described mandrel construction or any other type of mandrel construction which will enable rubber to be deposited on the surface thereof may be employed for the purposes of this invention.

In order to remove the mandrel from the rubber tube after the rubber tube has been formed on the exterior surface of the mandrel, it is necessary to construct the mandrel in at least two sections. A joint must be provided between such sections which is operable while the rubber tube overlies the exterior surface of the mandrel so as to separate the ends of the sections, and permit the withdrawal of the sections through an aperture in the tube. In the form of invention shown in Fig. 1, two semi-circular sections 5 and 6 are provided. A greater number of sections may be provided if desired. The sections 5 and 6 have members carried in the extremities thereof which are constructed to interfit and to maintain the sections in alignment. One pair of such interfitting members is shown at 7 and 8 respectively in sections 5 and 6 of the mandrel. The members 7 and 8 are fitted into the ends of the hollow mandrel 1 either by a drive fit or by screwing the members 7 and 8 into the mandrel or in any other suitable manner. In the members 7 and 8 are provided a male and female joint 9 for aligning the ends of the sections when in interfitting relation.

At the ends of the sections 5 and 6 opposite from the members 7 and 8 are provided additional interfitting members 10 and 11 in sections 5 and 6 respectively, which have the male and female joint 12 adapted to align the ends of the sections 5 and 6 in interfitting relation. The members 10 and 11 may be united to the sections 5 and 6 in any suitable manner as by a drive fit. Where a wrap of fabric 4 is applied over the exterior surface of the mandrel the fabric is turned over the ends of the sections 5 and 6 as shown at 13 in Fig. 2 and clamped between the members 10 and 11 and the sections 5 and 6 as shown at 14 in Fig. 2. A similar arrangement for clamping the fabric may be provided between the members 7 and 8 and the sections 5 and 6.

In order to maintain the sections 5 and 6 in assembled relation suitable clamping means is provided which conveniently is associated with one of the pairs of interfitting members, and in Fig. 1 is shown associated with interfitting members 10 and 11. In the particular form of clamping means shown in Fig. 1 the members 10 and 11 are provided with extensions 15 and 16 respectively which are constructed to interfit along a line 17 and, when in interfitting relation, to form a tapered pin extending exteriorly of the mandrel through the aperture 18 formed in the sections 5 and 6. A collar 19 is arranged on the tapered pin 18 and serves to lock or clamp the interfitting members 10 and 11, and therefore the sections 5 and 6, together.

Where the mandrel is of the hollow serum removing type as shown in Fig. 1, tubes 20 and 21 may be provided for withdrawing the serum from the interior of the mandrel and are conveniently arranged to extend through the extensions 15 and 16 of the interfitting members 10 and 11. Where such tubes 20 and 21 are provided a pipe connection 22 may be attached to the pin 18 formed by the juxtaposed extensions 15 and 16.

In the use of the device shown in Fig. 1 the mandrel is immersed in a dispersion of rubber, the interior of the mandrel is evacuated and the serum withdrawn therefrom through the tubes 20, 21 and 22. The rubber constituents of the dispersion deposit upon the exterior surface of the mandrel to form a continuous rubber tube having an aperture surrounding the pin 18. After a sufficiently thick deposit of rubber is formed the coated mandrel is removed from the dispersion, the rubber is dried and vulcanized. The vulcanizing ingredients conveniently are incorporated in the dispersion. When the tube has been vulcanized the mandrel may be withdrawn therefrom by first removing the collar 19 so as to free the sections 5 and 6, then separating the sections 5 and 6, and withdrawing the sections end first through the aperture formed in the rubber tube surrounding the pin 18. The extensions 15 and 16 extending through the aperture formed in the rubber tube are convenient in withdrawing the mandrel from the tube. If desired, after vulcanization of the tube and before extracting the mandrel therefrom, air under pressure may be introduced into the mandrel so as to inflate the rubber tube and thereby separate it from the surface of the mandrel. The characteristics of rubber laid down from latex or like dispersions are such as to permit the rubber to be stretched so as to enlarge the aperture sufficiently to permit withdrawal of the mandrel from the tube without rupturing the tube.

A modification of the present invention shown in Figs. 2 and 3 consists of a mandrel of the serum extraction type such as disclosed in Fig. 1. The sections 5 and 6 of the mandrel shown in Fig. 1 are provided with interfitting tongues 23, 24, 25 and 26 formed in the material of the sections. The tongues interfit to form male and female joints between the ends of the two sections thereby aligning the sections and maintaining the sections in mandrel form when juxtaposed. In order to secure the sections 5 and 6 together extensions 27 and 28 are provided on the adjacent ends of the sections 5 and 6 respectively. The extensions 27 and 28 may be integral with the sections 5 and 6 or secured thereto by welding, brazing, riveting or any other suitable manner. When the sections 5 or 6 are juxtaposed in mandrel form the extensions 27 and 28 fit together along the interface 29 to form a tapered pin 30 over which the collar 31 may be fitted to secure the extensions 27 and 28, and therefore the sections 5 and 6, together. Conduits 32 and 33 are provided for extracting the fluids from the interior of the mandrel which conduits extend through the extensions 27 and 28 which may be connected with any suitable conduit.

A modified form of joint is shown in Figs. 4 and 5 in which case the interfitting members 34 and 35 are secured in the sections 5 and 6 in any suitable manner. The members 34 and 35 are provided with ring-shaped lugs which provide faces 36 extending flush with the exterior surface of the sections 5 and 6. The interfitting members 34 and 35 are provided with extensions 37 and 38 respectively which fit together along the interfitting face 39 when juxtaposed to form a tapered oval pin as indicated at 40. An oval collar 41 fits over the tapered face of the pin 40 and clamps the interfitting members 34 and 35 and therefore the sections 5 and 6 together. Conduits 42 and 43 may be provided extending to the interior of the mandrel to withdraw fluids therefrom and extending through the extensions 37 and 38 to which any suitable pipe connection may be made.

The operation of the various modifications of mandrel construction as shown in Figs. 2-5 are the same as that outlined in connection with the mandrel construction shown in Fig. 1.

As hereinabove pointed out the characteristics of the mandrel which effect the deposition of the solid constituents of a rubber dispersion on the exterior surface thereof are not essential to this invention. The essential features of this invention consist of providing an endless mandrel upon which an endless rubber tube may be formed by deposition from the dispersion which mandrel is in sections and which mandrel may be removed from the interior of the formed tube. Another essential feature of this invention is that the means for securing the sections together be operable, while a rubber tube covers the exterior surface of the mandrel. Other essential features of the invention and various modifications which may be made in the details of the invention are included within the scope of the invention as defined by the following claims.

Having thus described my invention, what I claim and desire to protect by Letters Patent is:

1. A circular mandrel on which rubber tubes may be formed by the deposition of the solid constituents of a rubber dispersion over the exterior surface thereof, said mandrel consisting of at least two segmental sections, members carried on each end of each section and constructed to interfit and to maintain juxtaposed sections in properly centered relation, at least one pair of said members each having a complementary extension projecting from the mandrel, which extensions cooperate to form an aperture in the rubber tube as it is built, and means cooperating with said extensions to clamp the sections in mandrel form.

2. A circular mandrel on which rubber tubes may be formed by the deposition of the solid constituents of a rubber dispersion over the exterior surface thereof, said mandrel consisting of at least two segmental sections, members carried on each end of each section and constructed to interfit and to maintain juxtaposed sections in properly centered relation, at least one pair of said members having an extension projecting from the mandrel and comprising cooperating extension elements carried by said sections, and means cooperating with said extension to clamp the sections in mandrel form, said extension being arranged to form an aperture in the rubber tube during its formation through which aperture the mandrel may be withdrawn from the tube.

3. A circular hollow mandrel on which rubber tubes may be formed by the deposition of the solid constituents of a rubber dispersion over the exterior surface thereof, said mandrel consisting of at least two segmental sections, each end of each section having members constructed to interfit and to maintain juxtaposed sections in properly centered relation, at least one interfitting pair of members having cooperating extension elements for securing said sections together in mandrel form, and means for conducting fluids from the interior of the mandrel through said extension elements.

4. A circular hollow mandrel on which rubber tubes may be formed by the deposition of the solid constituents of a rubber dispersion over the exterior surface thereof, said mandrel consisting of at least two segmental sections, each end of each section having members constructed to interfit and to maintain juxtaposed sections in properly centered relation, at least one interfitting pair of members having cooperating extension elements for securing said sections together in mandrel form, and means for conducting fluids from the interior of the mandrel through said extension elements, the extension formed by said elements being arranged to form an aperture in the rubber tube during the formation thereof through which aperture the mandrel may be withdrawn.

5. A circular hollow mandrel on which ruber tubes may be formed by the deposition of the solid constituents of a rubber dispersion over the exterior surface thereof, said mandrel consisting of at least two segmental sections, each end of each section having members constructed to interfit and to maintain juxtaposed sections in properly centered relation, at least one interfitting pair of members having a composite extension projecting exteriorly of the mandrel and adapted to form an aperture in the rubber tube during formation thereof, said pair of members having means for conducting fluids from the interior of said mandrel, and said pair of members having means for securing the sections together in mandrel form.

6. A circular hollow mandrel on which rubber tubes may be formed by the deposition of the solid constituents of a rubber dispersion over the exterior surface thereof, said mandrel consisting of two substantially semicircular sections, each end of each section having members constructed to interfit and to form a male and female joint, one pair of interfitting members having extensions adapted when together to form a tapered pin projecting exteriorly of the mandrel, a collar adapted to fit the tapered pin and lock the sections together in mandrel form, conduits passing through the extensions to the interior of the mandrel.

7. A circular hollow mandrel on which rubber tubes may be formed by the deposition of the solid constituents of a rubber dispersion over the exterior surface thereof, said mandrel consisting of two substantially semi-circular sections, each end of each section having members constructed to interfit and to form a male and female joint, one pair of interfitting members having extensions adapted when together to form a tapered pin projecting exteriorly of the mandrel, a collar adapted to fit the tapered pin and lock the sections together in mandrel form, conduits passing through the extension to the interior of the mandrel, said pin being arranged to form an aperture in the rubber tube during the formation of the tube through which aperture the mandrel may be withdrawn.

Signed at Passaic, county of Passaic, State of New Jersey, this 14 day of November, 1929.

HAROLD T. BATTIN.